E. S. BRADFORD.
LATHE OR MILLING MACHINE ATTACHMENT.
APPLICATION FILED NOV. 1, 1920.

1,407,515.

Patented Feb. 21, 1922.
3 SHEETS—SHEET 1.

Eugene S. Bradford
INVENTOR.

BY

William M. Ewan
ATTORNEY.

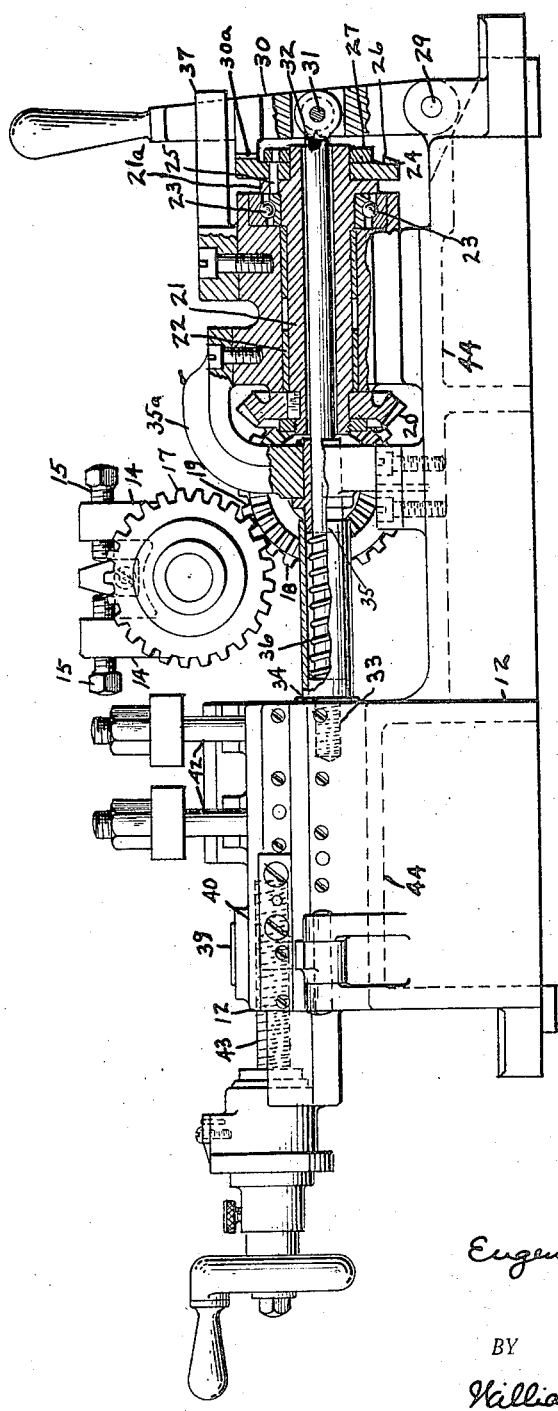

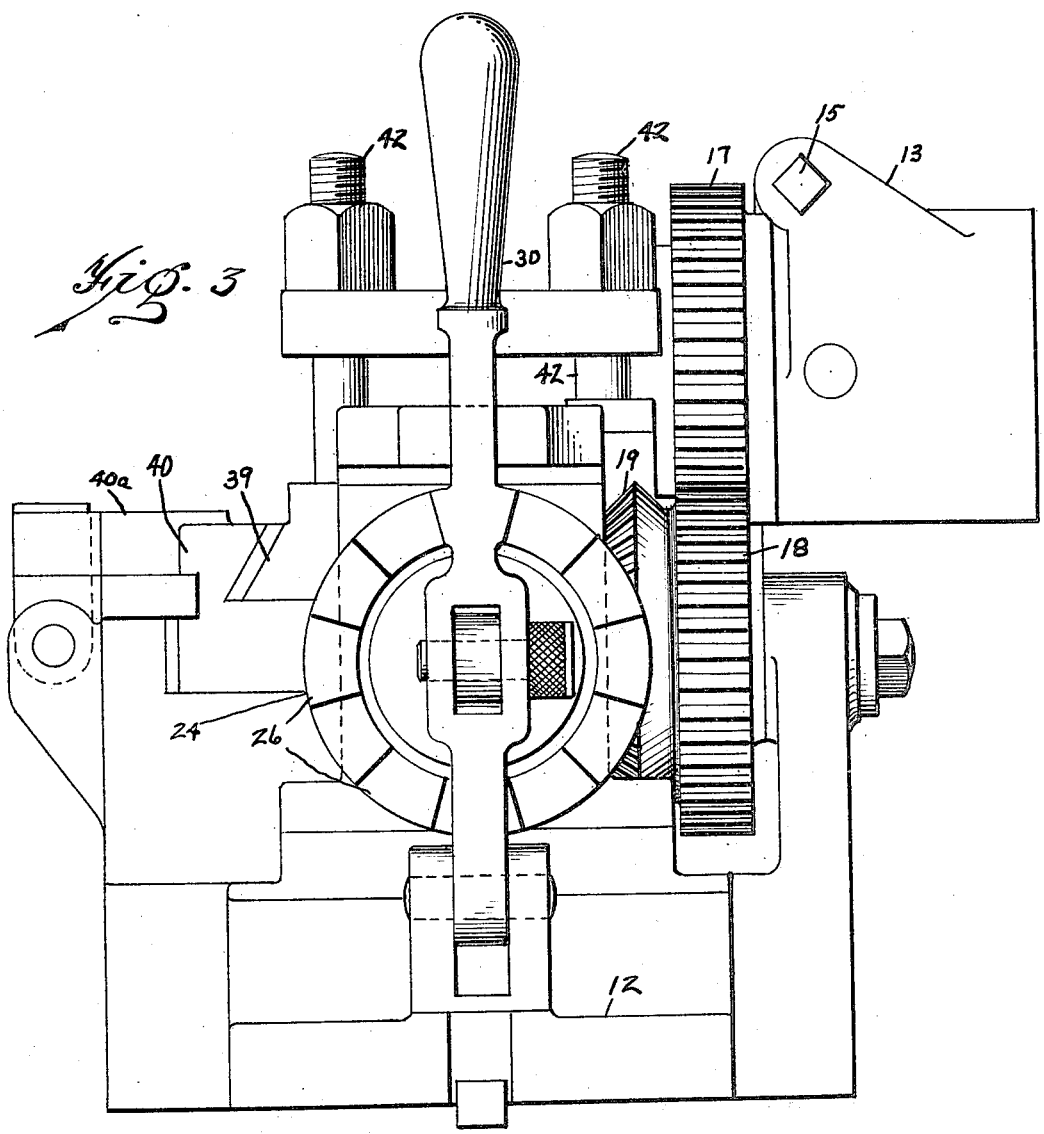

UNITED STATES PATENT OFFICE.

EUGENE S. BRADFORD, OF JACKSON, MICHIGAN.

LATHE OR MILLING-MACHINE ATTACHMENT.

1,407,515.  Specification of Letters Patent.  Patented Feb. 21, 1922.

Application filed November 1, 1920. Serial No. 420,874.

*To all whom it may concern:*

Be it known that I, EUGENE S. BRADFORD, a citizen of the United States, residing at Jackson, county of Jackson, State of Michigan, have invented a certain new and useful Improvement in Lathe or Milling-Machine Attachments, and declare the following to be a full, clear, and exact description of the same, such as will enable others skilled in the art to which it pertains to make and use the same, reference being had to the accompanying drawings, which form a part of this specification.

This invention relates to an attachment for a lathe or milling machine used especially for the backing off or relieving of the teeth of cutters, and has for its object an improved organization of parts adapted to hold a milled piece or similar article in desired position with respect to the cutting tool and to quickly and accurately effect such changes in the position thereof as will present unfinished parts of the blank to the action of the cutting tool at the desired angle or angles and in proper sequence.

In the drawings,

Figure 2 is an elevational view, partly in section; and

Figure 3 is an end elevational view.

Figure 1:
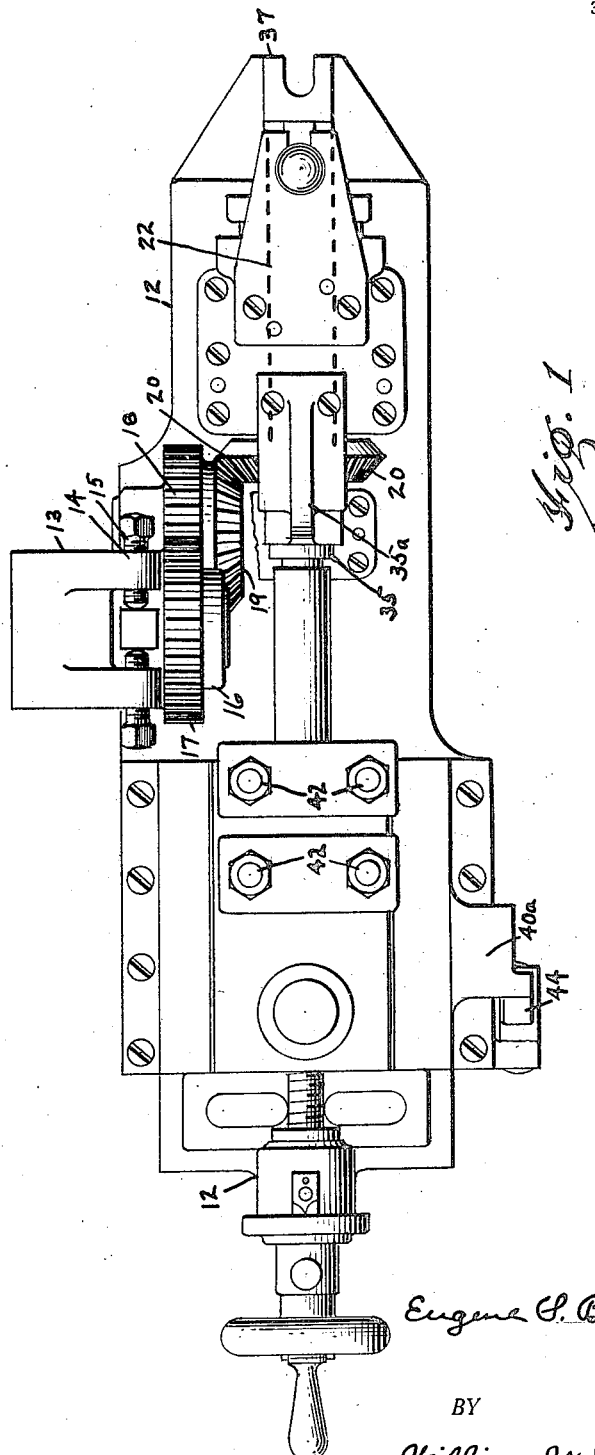
Figure 1 is a plan view of my improved device installed on a lathe.

12 represents the base or support of my improved attachment and 13 a driving head attached to the spindle of the lathe or milling machine and provided with upstanding lugs, 14, through which engage adjusting screws, 15, whereby the exact positioning of the blank to be milled may be regulated. In this driver head is rotatably supported the sleeve 16, on which is mounted the idler gear, 17, which meshes with the gear 18, a part of which is formed as a bevel gear, 19, whose teeth engage with the teeth of a bevel gear, 20, which is mounted on the end of a sleeve, 21, which is preferably surrounded by a bushing, 22. Near the outer end of the sleeve 21 is located a shoulder or flange 21ª, just within which is placed a ball race, 23, to take the lengthwise thrust of the sleeve 21. On the extreme outer end of the sleeve 21 is a cam, 24, connected by a pin 25 to the sleeve 21, and held against escape off the end of the sleeve 21 by means of the nut 27. Interposed between the shoulder 34 on the slide 40 and the shoulder 35 on the bracket 35ª is a spring 36 which tends to draw the lever 30 inwardly with respect to the cam 24, through the medium of the connecting rod 32. A projecting portion 30ª of the lever 30 engages the ratchet faces 26 of the cam 24, and, the lever 30 being connected, by means of the pin 31 with the rod 32, thus connects with the bottom slide 40, which supports the subordinate slide 39. Pivotally connected at 29 with the lower end of the lever 30 is the locking bar 44 whose other end is adapted to engage a projecting lug 40ª on the slide 40. Thus, as the lever 30 is swung by the engagement of the cam faces 26 against its projection 30ª, it is thrown out of action and the cutter blank carried on the driving head can be turned without any action of the cam. When the lever 30 is moved outwardly by the cam, the main slide 40 and with it the subordinate slide 39 are actuated through the medium of the connecting rod 32, thereby moving the master tool supported by the holder 42, in and out. Provision may be made, through the medium of the screw 43, for feeding the subordinate slide 39 independently of the main slide 40, and engagingly spaced over that end of the sleeve 21 adjacent the lever 30 is located a guide piece 37, for holding the lever 30 against the turning influence of the cam 24 as its faces 26 engage against the projecting portion 30ª of the lever.

What I claim is:

1. A lathe or milling machine attachment, having, in combination with a driver head, an idler gear rotatably journaled therein, a sleeve member having operative engagement with said idler gear, a cam member keyed to the opposite end of said sleeve member from that which engages said idler gear, a pivoted lever member adapted to be operatively engaged by said cam member, a connecting rod engaging within said sleeve, being connected at one end with said lever, a slide member, to which the other end of said connecting rod is attached, and a post for supporting a master tool, supported on said slide member.

2. In combination with a driver head, a sleeve member operatively associated with said driver head, a cam member fixed to the opposite end of said sleeve member from that adjacent the driver head, a pivoted lever operatively engaged by said cam member, means adapted to engage said lever to hold it against undesired rotative movement, means for exerting endwise thrust upon said sleeve in a direction away from said driver head, means for resisting such endwise thrust, a connecting rod arranged in parallel relation to said sleeve, to one end of which said lever is connected, a slide adapted to be controlled by said connecting rod, and means carried by said slide for supporting a master tool in desired position 3. The combination, with a driver head, of a sleeve member, one end of which is operatively associated with said driver head, a cam fixed on the other end of said sleeve member, a lever member adapted to be operatively engaged by said cam, means for holding said lever against undesired movement, a connecting rod to one end of which said lever is attached, a slide member operatively associated with the other end of said connecting rod, and means on said slide member for supporting a master tool in desired position.

4. In combination with a pair of slide members capable of movement relatively to one another, a holder for a master tool supported by one of said slide members, a rotatable sleeve, a spring for yieldingly forcing said slide members away from said sleeve member, means for opposing the thrust of said sleeve under the action of said spring, a driver head, means operatively connecting said driver head and said sleeve for effecting the rotative movement of the latter, a cam fixed to the opposite end of said sleeve from the end connected with the driver head, and a lever operatively connected with said slide members and adapted to be actuated by the action of said cam member thereagainst.

5. A milling machine attachment, having in combination a driver head, a rotatable sleeve operatively connected therewith, a cam fixed to the other end of said sleeve from that adjacent said driver head, means for rotatably actuating said cam and said sleeve, a connecting rod engaging through said sleeve, a lever connected with one end of said connecting rod, a pair of slide members capable of movement relatively to one another, to one of which the adjacent end of said connecting rod is attached, and means carried by one of said slide members for supporting a master tool in desired position.

6. In combination with a driver head, a sleeve member operatively connected at one end therewith, a cam member carried on the opposite end of said sleeve member, a pivoted lever adapted to be operatively engaged by said cam member, means for holding said lever out of engagement with said cam member, means for holding said lever against rotative movement, a connecting rod connected at one end with said pivoted lever, a slide member attached to the opposite end of said connecting rod, and means supported by said slide member for holding a master tool in operative position.

In testimony whereof, I sign this specification in the presence of two witnesses.

EUGENE S. BRADFORD.

Witnesses:
WILLIAM M. SWAN,
JEFFERS S. THURBER.